US009042217B2

(12) United States Patent
Casey et al.

(10) Patent No.: US 9,042,217 B2
(45) Date of Patent: *May 26, 2015

(54) DYNAMIC MODEM BANDWIDTH CHECKING (75) Inventors: Steven M. Casey, Littleton, CO (US); Felipe Castro, Erie, CO (US); Charles I. Cook, Louisville, CO (US); Michael D. Sprenger, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/967,901

(22) Filed: Dec. 14, 2010

(65) Prior Publication Data

US 2011/0103561 A1 May 5, 2011

Related U.S. Application Data (63) Continuation of application No. 12/234,801, filed on Sep. 22, 2008, now Pat. No. 7,889,670.

(51) Int. Cl.
*G01R 31/08* (2006.01)
*H04M 11/06* (2006.01)

(52) U.S. Cl.
CPC .................................. *H04M 11/062* (2013.01)

(58) Field of Classification Search
USPC ................. 370/229–258, 312, 328, 395.64, 370/401–405, 428; 709/203, 206, 227–229; 726/2–4, 11–15, 26–33; 725/25–31
See application file for complete search history.

(56) References Cited

U.S. PATENT DOCUMENTS

| 7,433,943 | B1 * | 10/2008 | Ford ............................. 709/223 |
| 7,689,716 | B2 | 3/2010 | Short et al. |
| 7,889,670 | B2 | 2/2011 | Casey et al. |
| 2001/0020241 | A1 * | 9/2001 | Kawamoto et al. ........... 707/202 |
| 2003/0145114 | A1 | 7/2003 | Gertner |
| 2006/0239254 | A1 | 10/2006 | Short et al. |
| 2007/0055478 | A1 | 3/2007 | Perazzolo |
| 2007/0115830 | A1 | 5/2007 | Kim et al. |
| 2007/0192168 | A1 | 8/2007 | Van Luchene |

(Continued)

OTHER PUBLICATIONS

U.S. Appl. No. 12/234,801, Notice of Allowance dated Oct. 6, 2010, 8 pages.
U.S. Appl. No. 12/234,801, Notice of Publication dated Mar. 25, 2010, 1 page.

(Continued)

*Primary Examiner* — Jung-Jen Liu
(74) *Attorney, Agent, or Firm* — Swanson & Bratschun, L.L.C.

(57) ABSTRACT

Methods, systems, devices, and software are disclosed for providing controlled access to network characteristic data stored at a subscriber premises. In one embodiment, Internet services are provided to a subscriber through a subscriber's modem, connected to the Internet through an access network, and to a number of data terminals on a local network. The modem is adapted to receive and/or generate data from the connected networks and devices for use in generating network characteristic data. This data is stored in an access-controlled data storage module. Content providers may then login to the modem and query network characteristic data. The modem is configured to authenticate the content provider, and, if authorized and available, return the queried data to the content provider. The content provider may then communicate information to the subscriber's data terminal through the modem, according to the network characteristic data returned by the query.

27 Claims, 8 Drawing Sheets

(56) References Cited

U.S. PATENT DOCUMENTS

2010/0050248 A1      2/2010  Porras et al.
2012/0233672 A1*    9/2012  Kezys et al. .................. 726/5
2012/0260320 A1*  10/2012  Keeler et al. ................. 726/4
2013/0035106 A1*    2/2013  Hans et al. ............... 455/452.1

OTHER PUBLICATIONS

U.S. Appl. No. 12/234,801, Office Action dated May. 27, 2010, 24 pages.

U.S. Appl. No. 12/234,801, Issue Notification dated Feb. 15, 2011, 1 page.

* cited by examiner

DYNAMIC MODEM BANDWIDTH CHECKING

RELATED APPLICATIONS

This application is related to the following U.S. patent applications, the entire disclosures of which are hereby incorporated by reference: This application is a continuation of U.S. application Ser. No. 12/234,801 filed on Sep. 22, 2008 now U.S. Pat. No. 7,889,670 by Casey, entitled "Dynamic Modem Bandwidth Checking."

FIELD

Embodiments of the invention are related to telecommunication services, and in particular, to the provision of access to certain modem data over a network.

BACKGROUND

In many networks, including the Internet, content communication over the network may be affected by certain network characteristics. These network characteristics may include one or more physical or logical characteristics of the network. For example, communications may be impacted by characteristics of a communication link (e.g., bandwidth, throughput, packet error rate, etc.), characteristics of a data terminal (e.g., resolution, memory, interface capabilities, etc.), and/or characteristics of a communication (e.g., protocol, security, quality-of-service guarantees, etc.). To improve content communications over the network, content providers may desire to profile network characteristics so as to adjust content communications accordingly.

Many network service subscribers communicate with a primary network (e.g., the Internet) through a modem or other network interface device. Because of the location and function of the modem in the network, the modem may be capable of directly receiving, measuring, and/or recording characteristics of the networks and devices with which it is connected. However, even where a modem has network profiling capabilities, these capabilities may be limited to profiling a small subset of potentially desirable network characteristics. Further, the data generated by the modem may not be available to content providers.

Instead, to profile certain network characteristics, content providers may typically communicate (i.e., transmit and receive) and track test data over the network. By tracking the communication, some desired network characteristics can be indirectly approximated. For example, by tracking the time it takes to send and receive a packet over the network, it may be possible to approximate the throughput, bandwidth, delay, etc. of the network. However, this and other similar ways of profiling network data may be limited for a number of reasons. One reason is that it may be possible to profile only a small subset of potentially desirable network characteristics. Another reason is that even those network characteristics that may be profiled, may often only be approximated.

As such, it may be desirable to directly generate desirable network characteristics and to manage the data so as to be available in a useful way for authorized content providers.

BRIEF SUMMARY

Among other things, embodiments of the invention include methods, systems, and apparatuses for directly generating desirable network characteristics and for managing the data so as to be available in a useful way for authorized content and/or service providers.

In one embodiment, Internet services are provided to a subscriber through a subscriber's modem, connected to the Internet through an access network, and to a number of data terminals on a local network (e.g., a desktop computer, a laptop computer, a WiFi-enabled handheld device, etc.). The modem is adapted to receive and/or generate data from the connected networks and devices for use in generating network characteristic data (e.g., by directly or indirectly measuring network characteristics, by being sent data from external sources, etc.). This data is stored in an access-controlled data storage module. Content providers may then login to the modem and query network characteristic data. The modem is configured to authenticate the content provider, and, if authorized and available, return the queried data to the content provider. The content provider may then communicate information to the subscriber's data terminal through the modem, according to the network characteristic data returned by the query.

One set of embodiments includes a network access system, adapted to be located at a premises of a subscriber of network services provided by a network service provider, and adapted to be in operative communication with a primary network via an access network and at least one subscriber terminal via a local network. The system includes a data storage module, adapted to store network characteristic data; an interface module, adapted to receive a request for a requested portion of the network characteristic data over the access network from a requesting party; an access module, adapted to determine whether the requesting party has access rights to the requested portion of the network characteristic data; and a query module, adapted to execute a query against the network characteristic data when the requesting party has access rights to the requested portion of the network characteristic data, the query being generated as a function of the request and adapted to retrieve results data relating to at least some of the requested portion of the network characteristic data; a reporting module, adapted to report the results data for communication over the access network to the requesting party.

Another set of embodiments includes a method for providing controlled access to a requesting party requesting network characteristic data associated with a subscriber of network services provided by a network service provider. The method includes receiving a request from the requesting party for a requested portion of the network characteristic data, the network characteristic data being stored in a data storage module located at a subscriber end of an access network over which the subscriber receives the network services, the request being received over the access network; determining whether the requesting party has access rights to the requested portion of the network characteristic data; and only when the requesting party has access rights to the requested portion of the network characteristic data: executing a query against the network characteristic data as a function of the request; retrieving results data relating to at least some of the requested portion of the network characteristic data as a function of the executed query; and reporting (e.g., securely) the results data for communication over the access network to the requesting party.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Among other things, embodiments of the invention allow application providers to obtain privileged access to desired network characteristics stored by and/or at a subscriber modem. Various embodiments include methods, systems, and apparatuses for directly generating desirable network characteristics and for managing the data so as to be available in a useful way for authorized content providers.

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features. Further, while various embodiments are described with reference to the Internet, embodiments of the invention may be implemented in any network.

In many networks, including the Internet, content communication over the network may be affected by certain network characteristics. These network characteristics may include one or more physical or logical characteristics of the network. For example, communications may be impacted by characteristics of a communication link (e.g., bandwidth, throughput, packet error rate, etc.), characteristics of a data terminal (e.g., resolution, memory, interface capabilities, etc.), and/or characteristics of a communication (e.g., protocol, security, quality-of-service guarantees, etc.).

Further, these network characteristics may change dynamically over time, over location, or even among various devices connected to the network. For instance, say a subscriber receives Internet traffic through a digital subscriber line ("DSL") modem at the subscriber end of the subscriber's access network. The DSL modem is connected to a WiFi hub/router that provides a local network throughout the subscriber's premises (e.g., the subscriber's house). The subscriber has a desktop computer plugged directly into the WiFi hub/router via an Ethernet cable, a laptop computer adapted to communicate with the WiFi hub/router via a wireless connection, a web-enabled high-definition television adapted to communicate with the WiFi hub/router via a separate dedicated wireless device, and a cellular telephone adapted to connect to the local WiFi network when a certain signal strength is detected.

Each of the devices in the illustrative subscriber's network may experience and/or create different network characteristics. In one example, the portable devices may experience dynamically changing bit error rates as the devices move throughout the subscriber's premises (e.g., I-beams in the structure, distance from the WiFi hub/router, etc. may affect the signal integrity). In another example, the high-definition television may desire significantly higher resolution data at significantly higher data rates than the cellular telephone. In yet another example, certain of the devices may have better antennae, larger buffers, and other characteristics that may affect communications with those devices. In still another example, statistical variations in the access network, applications being run on the network, issues with network infrastructure, and many other potential factors may affect the operation of the network. It will be appreciated that these and other factors may be present in any type of network, including DSL, cable, satellite, and others.

To improve content communications over the network, content providers may desire to profile some or all of those network characteristics so as to adjust content communications appropriately, where possible. For example, say a subscriber desires to watch a streaming video file of a movie over the Internet. The subscriber may login to a website that offers the video content, and communicate a request to view the content. The website may then desire to respond by providing the content in the best way possible. Ideally, the website may want to optimize its content delivery as a function of the bandwidth of the subscriber's network (e.g., or the effective bandwidth, accounting for bit error rates, throughput, latency, buffering capabilities, etc.), the resolution of the subscriber's receiving device, and/or other factors.

Typically, the content provider (e.g., the website) may attempt to profile the network for these types of characteristics by either asking for the information from the subscriber or by guessing the information from indirect measurements. In the first way, the content provider may ask the subscriber one or more questions about the subscriber's network. For example, the subscriber may be prompted to select whether "high" or "low" resolution video is desired, or to specify the type of connection the subscriber has to the Internet.

In the second way, content providers may communicate (i.e., transmit and receive) and track test data over the network. By tracking the communication, some desired network characteristics can be indirectly approximated. For example, the content provider may transmit packets (e.g., test packets with certain parameters, packets of the requested content, etc.) to the subscriber with a request to receive packets in return. By tracking the time it takes to send and receive the packets over the subscriber's network, it may be possible to approximate certain characteristics (e.g., the bandwidth) of the network.

However, these and other similar ways of profiling network data may be limited for a number of reasons. One reason is that it may be possible to profile only a small subset of potentially desirable network characteristics. In the first way (i.e., prompting the subscriber for information), for example, it may provide a cumbersome and undesirable experience for a subscriber to be required to input large amounts of information, much of which may be difficult or impossible to accurately obtain. In the second way (i.e., tracking test packets), for another example, only timing-related information may be tracked. As such, it may not be possible to detect device-specific information and/or other network characteristics.

Another reason that these indirect profiling techniques may be limited is that even those network characteristics that may be profiled, may often not be accurate. When prompting the subscriber, for example, much of the desired network information may be unknown or misunderstood by the subscriber. When tracking test packets, for another example, it may be impossible to know what network characteristics are impacting the timing of the packet communications (e.g., in one case, the network may have limited bandwidth; in another case, the network may have very high bandwidth while also having very high packet error rates).

For at least these reasons, indirect profiling techniques may be limited in accuracy, effectiveness, and/or desirability. And, while more direct profiling techniques may be desirable, it is worth noting that network service providers and/or subscribers may not wish to give full access to these data to any party requesting the data. For example, network data may yield information (directly or indirectly) relating to network limitations (e.g., which a service provider may not want to make available to its competitors), to the number and type of devices connected to the network, to the applications running on the network, to certain billing information, etc.

As such, it may be desirable to provide systems and methods for improved profiling of network characteristic data, and for allowing privileged access to the profiled data to authorized parties (e.g., content providers). It will be appreciated that embodiments of the invention may be implemented for use with any type of data network (e.g., DSL, cable, satellite, LAN, WAN, etc.), any type of network access device (e.g., modems, routers, hubs, etc.), any type of data device in communication with the network (desktop and laptop computers, cellular telephones, web-enabled audiovisual systems, etc.), etc. As such, use of specific terms (e.g., "modem") intend to include reference to all similar implementations (e.g., any network access device).

Figure 1:
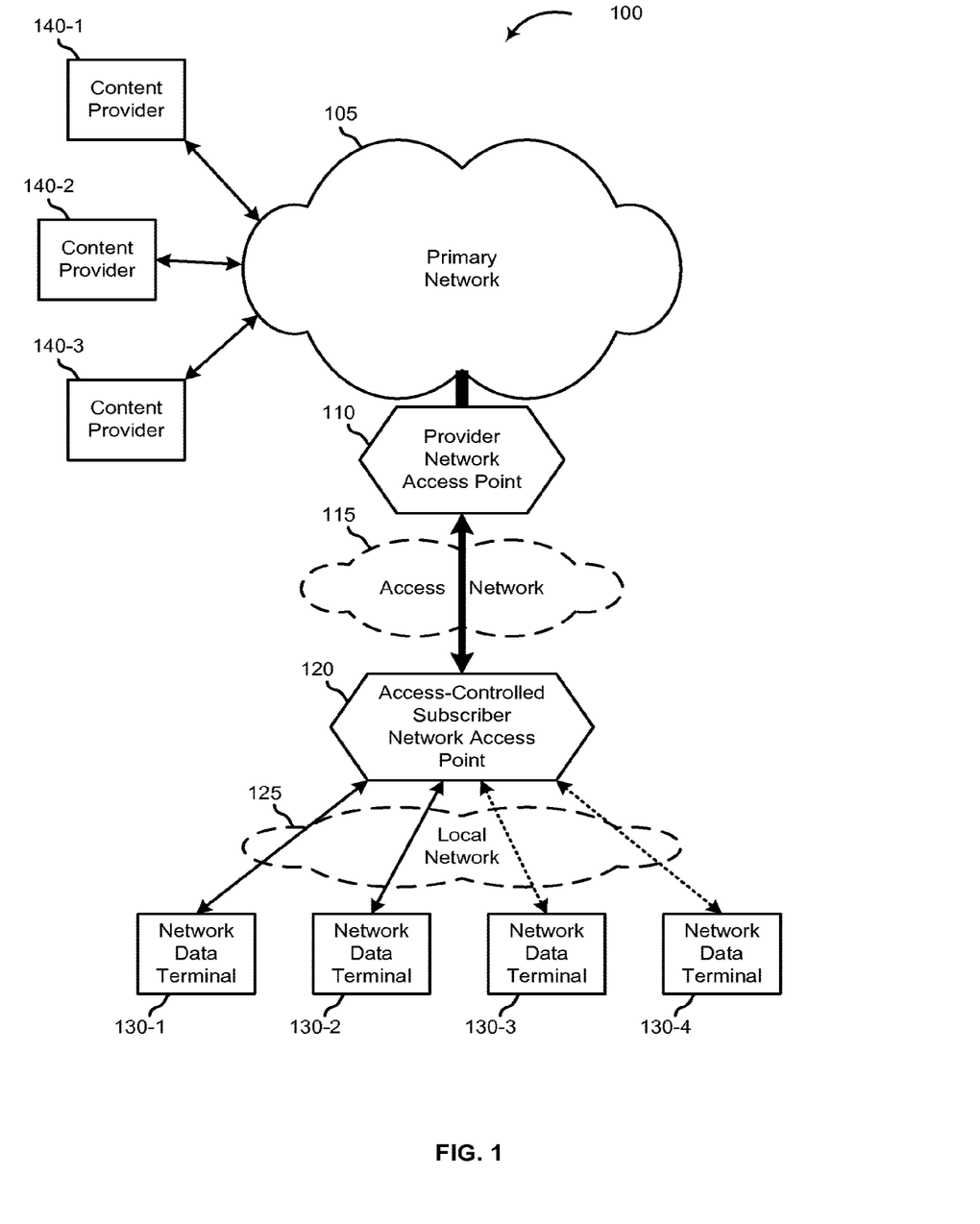
FIG. 1 shows a typical illustrative network environment, according to various embodiments of the invention.

Turning first to FIG. 1, a typical illustrative network environment is shown according to various embodiments of the invention. The network environment 100 includes a local network 125 that communicates with a primary network 105 through an access network 115. An access-controlled subscriber network access point 120 handles communications with the access network 115 at the subscriber end of the access network 115, and a provider network access point 110 handles communications with the access network 115 at the primary network 105 end of the access network 115.

As illustrated, one or more network data terminals 130 may communicate with the local network 125. It will be appreciated that the network data terminals 130 may include any type of data terminal adapted to communicate over the local network. For example, various types of computers, peripherals, appliances, telecommunication devices, and/or other types of network data terminals 130 may be in communication with the local network 125. It will be further appreciated that the various network data terminals 130 may communicate with the network using any type of connection (e.g., wired, wireless, optical, etc.), any type of protocol, any type of security, etc.).

In one embodiment, a subscriber uses a laptop computer as one of the network data terminals 130 in the subscriber's house. The laptop is in wireless connection with a home WiFi network (i.e., the subscriber's local network 125), handled by a WiFi hub/router. The WiFi hub/router is connected to a DSL modem having a direct, wired connection to the subscriber's access network (i.e., the DSL modem and/or the WiFi hub/router may function, alone or in conjunction, as the access-controlled subscriber network access point 120). The access network 115 may include any type or types of DSL connection (e.g., copper, ADSL, ADSL2+, VDSL, VDSL2, etc.) to a DSL access multiplexer ("DSLAM") (i.e., the provider network access point 110), managed by a network service provider. The DSLAM may then handle communications between the access network 115 and the primary network 105 (e.g., the Internet). Of course, in other embodiments, other types of connections may be used. For example, a fiber-optic connection may terminate the access network 115 at a provider network access point 110 implemented as an Optical Line Termination ("OLT") system.

It will be appreciated that using this and/or many other types of network environment 100, content may be communicated between one or more subscriber network data terminals 130 and one or more content providers 140. Because all communications to and from the subscriber's local network 125 pass through the access-controlled subscriber network access point 120, the access-controlled subscriber network access point 120 may be in a desirable position to directly and/or indirectly profile both the access network 115 and the local network 125 for various network characteristics. As such, by providing content providers with controlled access to the access-controlled subscriber network access point 120, it may be possible to provide the content providers with access to the network characteristics they desire.

For example, an Internet Protocol television ("IPTV") provider (e.g., content provider 140-1) desires to send television video content over the Internet (e.g., primary network 105) to a subscriber's IP-enabled television (e.g., network data terminal 130-1). The content is communicated through the provider network access point 110 (e.g., a DSLAM), the subscriber's access network 115, the access-controlled subscriber network access point 120, and the subscriber's local network 125. The IPTV provider 140-1 may desire to know the bandwidth of both the access network 115 and the portion of the bandwidth being allocated to the communication link in the local network 125 between the access-controlled subscriber network access point 120 and the IP-enabled television 130-1. The content provider may also desire to obtain other information, like the resolution and buffering capabilities of the IP-enabled television 130-1, the identity of the individual requesting the content (e.g., where parental controls and/or other subscriber-initiated access controls are in place), etc.

In some cases, the access-controlled subscriber network access point 120 may receive network characteristics by directly profiling the network. For example, the DSL modem may directly measure throughput, packet error rates, latency, number of devices connecting to the network, etc. In other cases, the access-controlled subscriber network access point 120 may receive network characteristics by indirectly profiling the network. For example, the DSL modem may track test data over portions of the network, record and/or generate statistics relating to network characteristics and usage, etc. In still other cases, the access-controlled subscriber network access point 120 may receive network characteristics by having information communicated from one or more parties. For example, the subscriber, network service provider, content provider, and/or any other authorized party may provide information to the DSL modem.

In various embodiments, a content provider 140 may be authorized to access some or all of the network characteristic information profiled (e.g., generated, received, etc.) by the access-controlled subscriber network access point 120. For example, in one embodiment, the content provider may query certain data generated by and stored at the access-controlled subscriber network access point 120. The access-controlled subscriber network access point 120 may handle access to the network characteristic data by providing interface, processing (e.g., query handling, reporting, etc.), access-control, storage, and/or other functionality.

It is worth noting that the access-controlled subscriber network access point 120 may provide different types and/or levels of access to different types of content providers (or other requesting parties). For example, in certain instances, the service provider may be the content provider, desiring to submit queries for certain network characteristic information. The service provider may then use the received network characteristic information for either the same types of purposes as those of another content provider (e.g., to provide more tailored or optimized content, etc.), to support administrative functions (e.g., billing, load balancing, tracking, security, etc.), or any other purpose.

Figure 2:
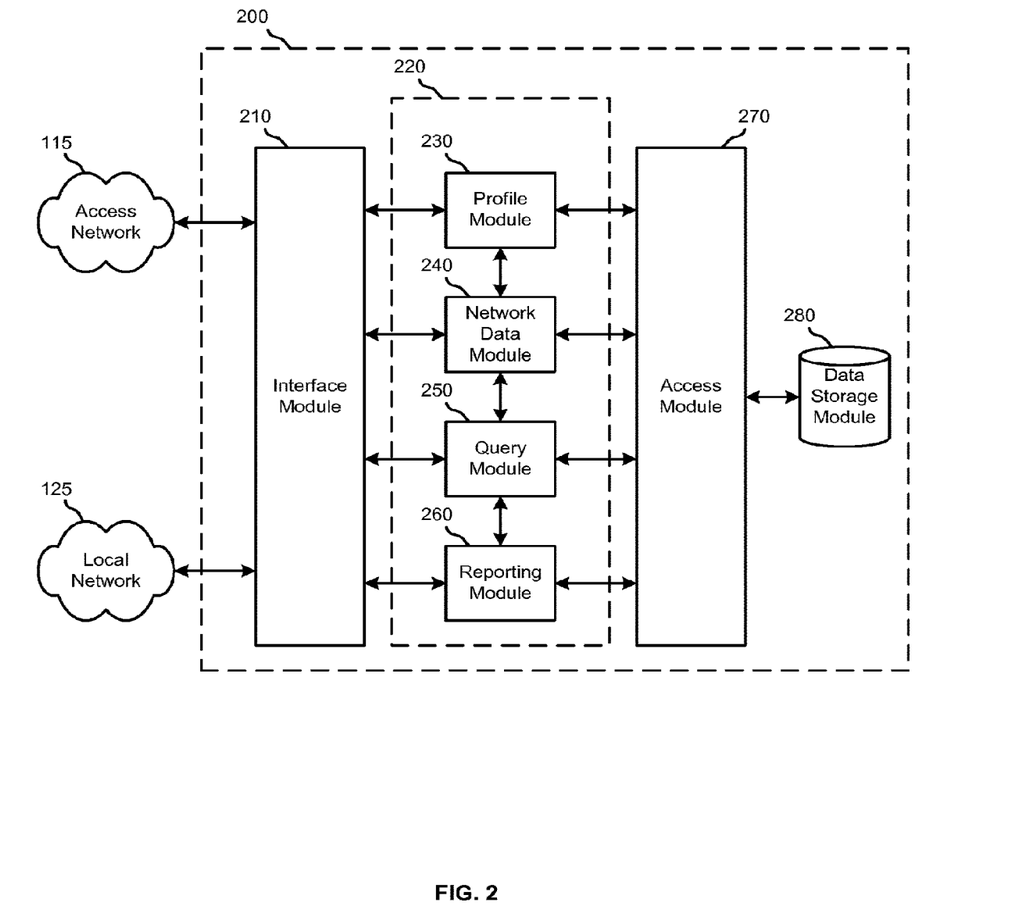
FIG. 2 shows an illustrative embodiment of an access-controlled subscriber network access point, according to various embodiments of the invention.

It will be appreciated that various embodiments of access-controlled subscriber network access points 120 are possible for providing desired functionality, according to the invention. Indeed, the functionality of the access-controlled subscriber network access point 120 may be provided by one or more components, in one or more different ways. For example, in some embodiments, certain functionality of the access-controlled subscriber network access point 120 is distributed across one or more data terminals 130 and/or parts of the local network 125. FIG. 2 shows an illustrative embodiment of an access-controlled subscriber network access point, according to various embodiments of the invention.

The access-controlled subscriber network access point 200 includes an interface module 210, a processing module 220, and an access module 270. In various embodiments, the various components of the access-controlled subscriber network access point 200 may or may not be collocated or integrated. For example, the data storage module 280 may be removed from other components of the access-controlled subscriber network access point 200. Some embodiments of the access-controlled subscriber network access point 200 provide the functionality of the access-controlled subscriber network access point 120 of FIG. 1.

The interface module 210 is adapted to handle communications with an access network 115 and a local network 125. In some embodiments, the interface module 210 includes one or more physical and/or logical ports for interfacing with the access network 115 and the local network 125. Embodiments of the interface module 210 may also include other functionality for interfacing. In one embodiment, the interface module 210 includes a web server adapted to generate web-enabled access to the access-controlled subscriber network access point 200. In another embodiment, the interface module 210 includes functionality for generating one or more graphical user interfaces ("GUIs") for facilitating access to other functions of the access-controlled subscriber network access point 200. In general, embodiments of the interface module 210 provide interface functionality between networks (e.g., the access network 115 and the local network 125) and the various functions of the processing module 220.

Embodiments of the processing module 220 may provide any useful functionality of the access-controlled subscriber network access point 200. In the illustrative embodiments of FIG. 2, the processing module 220 includes a profile module 230, a network data module 240, a query module 250, and a reporting module 260. In various embodiments, some or all of these various modules of the processing module 220 may be in communication (e.g., directly or indirectly coupled) with the interface module 210, with each other, and/or with the access module 270.

In some embodiments, the profile module 230 receives and/or generates profile information relating to the subscriber and/or subscriber devices. It will be appreciated that many types of profile information are possible. For example, the profile information may include account information (e.g., subscriber financial information, parental controls, account entitlements, etc.), preference information (e.g., opt-in or opt-out to various types of content, advertisement preferences, preferred applications, etc.), devices information (high-definition, portable video players, etc.), etc. Generally, embodiments of the profile module 230 receive information from one or more entities for use in generating network characteristic information.

In addition to receiving information, it may be desirable to directly or indirectly measure information from the network. Embodiments of the network data module 240 provide this functionality. In some embodiments, the network data module 240 includes network testing functionality for testing or measuring various characteristics of the access network 115 and/or the local network 125. For example, the network data module 240 may measure maximum throughput, available bandwidth, error rates, latency, hop counts, etc. The information may also include statistics relating to the network characteristics. For example, the network data module 240 may track changes in bandwidth, usage, or allocations over time. In certain embodiments, the information may further include provisioned and related network characteristics. For example, the network data module 240 may receive information relating to provisioned Quality of Service ("QoS") or other provisioned performance level-related data.

In other embodiments, the network data module 240 obtains information relating to the number and/or type of devices connected to the local network 125. This information may include amounts of bandwidth allocated to each device, capabilities or limitations (e.g., resolution) of each device, types of applications running on each device, device-specific preferences, etc. The information may also include statistics relating to the device. For example, the network data module 240 may track device-specific usage over time.

It will be appreciated that many types of profile and/or network data are possible, according to embodiments of the profile module 230 and/or the network data module 240. Further, it will be appreciated that some types of data may be obtainable by exploiting joint functionality of the profile module 230 and the network data module 240. Even further, it will be appreciated that the functionality of the profile module 230 and/or the network data module 240 may be implemented in a number of ways, including using one or more components, systems, software routines, etc.

When a content provider or other party wishes to access network characteristic information (e.g., as received or generated by the profile module 230 and/or network data module 240), it may communicate a request for desired information to the access-controlled subscriber network access point 200 via the interface module 210. Embodiments of the processing module 220 may provide functionality to process the request using the query module 250 and to report the query results using the reporting module 260.

For example, the party may login to the access-controlled subscriber network access point 200 via a web page generated by the interface module 210. The web page may be adapted to receive a request, for example, in the form of a query. It is worth noting that many ways of querying information are known in the art, any of which may be used with embodiments of the invention. For example, the query may include Boolean or "plain language" search terms, special syntaxes, interface controls (e.g., radio buttons, check boxes, selectors, etc.), filters, sorters, etc.

Embodiments of the query module 250 may receive the query from the interface module 210 and process the query. Processing the query may involve different types of functionality, depending on the type of query communicated to the query module 250. In one embodiment, a "plain language" search is received by the query module 250. The query module 250 may first process (e.g., parse) the search string to generate an executable query to run against stored data. In another embodiment, the query module 250 includes a database server (e.g., a Structured Query Language, or "SQL," server) for handling received queries. In still other embodiments, the query module 250 is adapted to perform data processing functionality, including sorting, filtering, parsing, translating, interpolating, etc.

After the query is executed, results may be returned. Embodiments of the reporting module 260 are adapted to report the query results and communicate the reported results to the requesting party through the interface module 210. It will be appreciated that, in some embodiments, the reporting module 260 may have similar or inverse functionality to the query module 250. For example, where the query module 250 is adapted to translate "plain language" queries into executable queries, the reporting module 260 may be adapted to translate the results of the executable query back into a "plain language" result.

Various embodiments of the reporting module 260 may include many different types of functionality. In some embodiments, the reporting module 260 receives query results, and analyzes them against parameters of the query (e.g., for verification, filtering, sorting, etc.). In other embodiments, the reporting module 260 formats the query results according to predefined templates, preferences, protocols, etc. In still other embodiments, the reporting module 260 formats or prepares the query results for certain types of storage devices, printers, etc.

It will be appreciated that embodiments of the processing module 220 and its various components may perform many functions in many ways, according to embodiments of the invention. Notably, some or all of these components may be in communication with the access module 270 for controlling access to the respective functions of the components. In some embodiments, the access module 270 provides access controls through logical data security. For example, the access module 270 may use secured protocols (e.g., HTTPS, SSL, etc.), authentication (e.g., evaluation of used identifiers and passwords, analysis of request origin, shared keys, etc.), authorization (e.g., granting or denying access based on user credentials or permissions), file management (e.g., access-controlled directory structures, file flags, data headers, etc.), and/or other types of logical access controls. In other embodiments, the access module 270 provides access controls through physical security measures (e.g., physical locks, physical separations in data volumes, etc.).

In these and/or other ways, embodiments of the access module 270 control access to data stored in the data storage module 280. It is worth noting that embodiments of the data storage module 280 may be adapted in any useful way according to desired functionality. For example, the data storage module 280 may include one or more data storage devices, including databases, servers, removable media, hard disk drives, etc. Further, the data storage module 280 may store network characteristic data in any useful data structure, format, etc.

It will be appreciated that many implementations of embodiments of the access-controlled subscriber network access point 200 are possible, according to embodiments of the invention. For example, various components may be collocated or distributed, or certain functions of the components may be collocated or distributed. Another illustrative set of embodiments of an access-controlled subscriber network access point is shown in FIG. 3, according to various embodiments of the invention.

Figure 3:
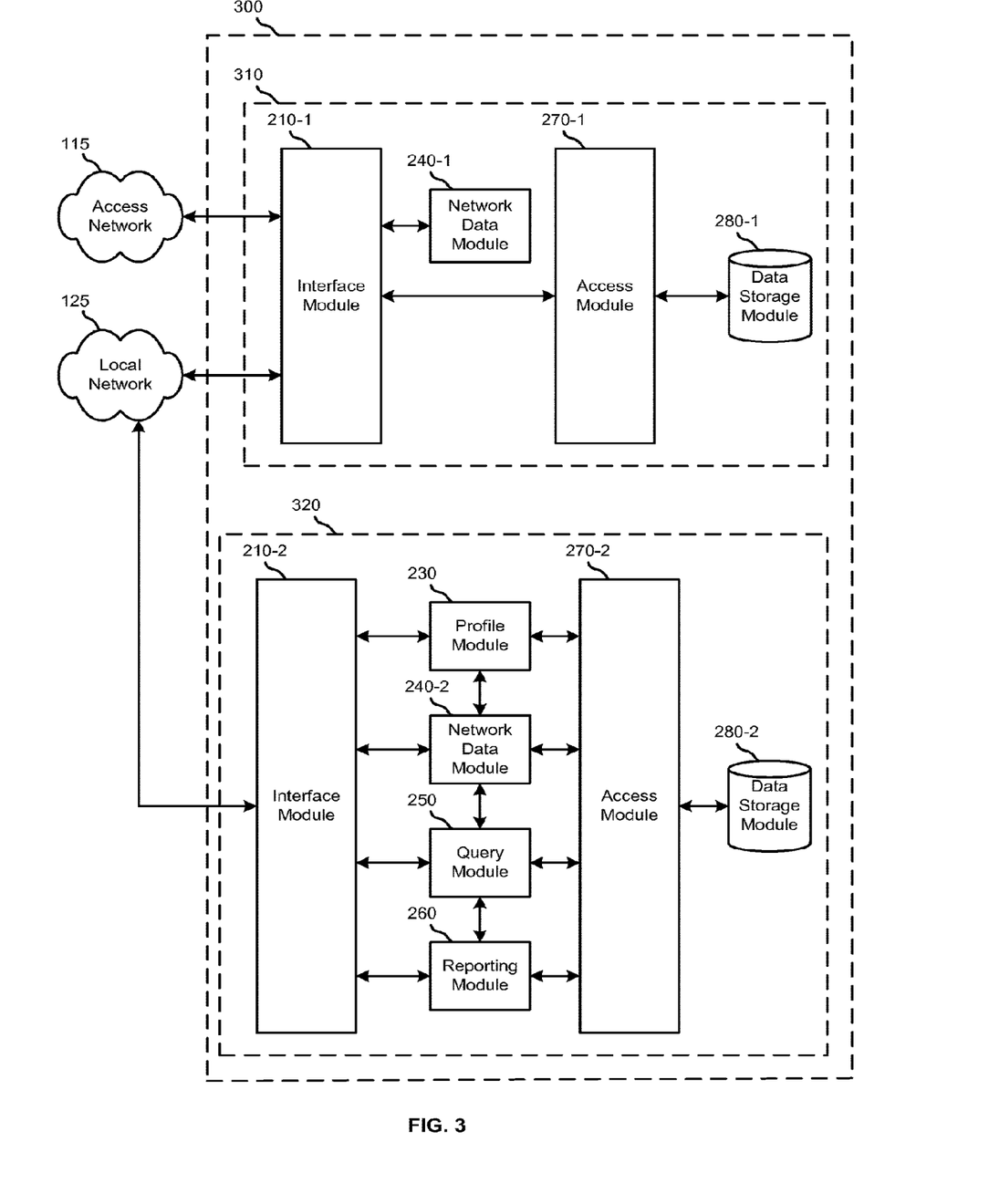
FIG. 3 shows another illustrative set of embodiments of an access-controlled subscriber network access point, according to various embodiments of the invention.

In the embodiments of FIG. 3, functionality of the access-controlled subscriber network access point 300 (e.g., like the access-controlled subscriber network access point 120 in FIG. 1) is distributed between a network access device 310 (e.g., a DSL modem) and a network data terminal 320 (e.g., a network data terminal 130 of FIG. 1). The network access device 310 includes a first interface module 210-1, a first network data module 240-1, a first access module 270-1, and a first data storage module 280-1. The network data terminal 320 includes a second interface module 210-2, a profile module 230, a second network data module 240-2, a query module 250, a reporting module 260, a second access module 270-2, and a second data storage module 280-2.

It will be appreciated that implementations like the one illustrated may provide certain benefits, like the ability to offload much of the processing, storage, and/or other functionality from the network access device 310 to the network data terminal 320. In fact, in many typical embodiments, most or all the functionality of the access-controlled subscriber network access point 300 may be implemented in the network access device 310. As such, the embodiments shown in FIG. *03 intend merely to illustrate possible alternative distribution options for the functionality of the access-controlled subscriber network access point 300, and should not be construed as limiting the scope of the invention.

In one embodiment, the network access device 310 has little functionality with regard to the access-controlled subscriber network access point 300. For example, the first interface device 210-1 may receive query requests and/or other information from the access network 115, use the first network data module 240-1 to directly profile the access network 115 for certain network characteristics, and use the first access module 270-1 and first data storage module 280-1 for a first tier of access control (e.g., to handle information relating to content provider authorization, preferences, internal modem settings, etc.). Some or all of the information may then be communicated over the local network 125 with the network data terminal 320 for further processing (e.g., as described with reference to the access-controlled subscriber network access point 200 of FIG. 2).

For example, a content provider may login to the access-controlled subscriber network access point 300 via a webpage generated by the first interface module 210-1 in the network access device 310. The content provider may then be authenticated via the first access module 270-1 and authentication information stored in the first data storage module 280-1, both located at the network access device 310. Once the content provider is authorized, the first interface module 210-1 may prompt the content provider for a query, again through the first interface module 210-1.

The raw query may be received through the first interface module 210-1 and communicated to the second interface module 210-2 located at the network data terminal 320. The query may then be processed by the query module 250 and converted into an executable query to run against various data stored in the second data storage module 280-2 located at the network data terminal 320. Data stored in the second data storage module 280-2 may include data received and/or generated by the first network data module 240-1 (located at the network access device 310), and by the profile module 230 and the second network data module 240-2 (both located at the network data terminal 320).

The second access module 270-2 may provide a second tier of access control. For example, even authorized content providers may only be authorized to view certain data (e.g., certain data types, formats, amounts, etc.). It will be appreciated that many types of access control in many tiers are possible. For example, access may be controlled by content provider, by data type (e.g., format, content, etc.), parameter (e.g., frequency or type of request), etc.

If the requesting party has access to the data requested in the query, the data may be returned and formatted by the reporting module 260. The results may then be communicated back to the requesting party, for example, through the interface modules 210 via the local network 125 and the access network 115. If the requesting party is denied access to the data requested in the query, some embodiments may still provide a response of some type. In some embodiments, the response may indicate that the request was denied. In certain embodiments, the response may further include information on why the response was denied and/or other useful information for the requestor.

Of course, other functionality may be provided. In one embodiment, network service providers may desire to send a message to denied requesters advertising upgraded services. For example, a denied requestor may receive a message reading "That information is only available to Gold Providers. Click here for more information on becoming a Gold Provider." In another embodiment, information relating to successful and/or unsuccessful requests or access attempts may be logged. This information may then be useful for targeting advertisements, detecting fraud or security breaches, etc.

In still another embodiment, certain types of buffering or other functionality may be provided to support communications or interactions subsequent to the query. For example, after a content provider receives query results, the content provider may provide content at least partly as a function of the received query results. In certain embodiments, the content or communication of the content (e.g., encoding) is adapted to the received query results. In those and other embodiments, buffering capabilities are adapted to the received query results. For example, if the query detects high bandwidth variability, it may be desirable to provide larger buffering to compensate for the variability. However, because larger buffering may create delays in the responsiveness of an application (e.g., while the user is waiting for the buffer to fill), it may be desirable to adapt the buffer size to be only slightly larger than necessary (e.g., or in any other useful way).

It will be appreciated that the functionality of the various components of the system (or the performance of various steps of the methods described below) may be implemented in a number of ways. For example, they may be implemented in hardware, firmware, software, or in any other effective way. Further, they may be implemented as one or more dedicated devices, as one or more components of a larger device, as one or more components of a system, etc. In some embodiments, they are implemented as or in a computational system (e.g., a computer).

Figure 4:
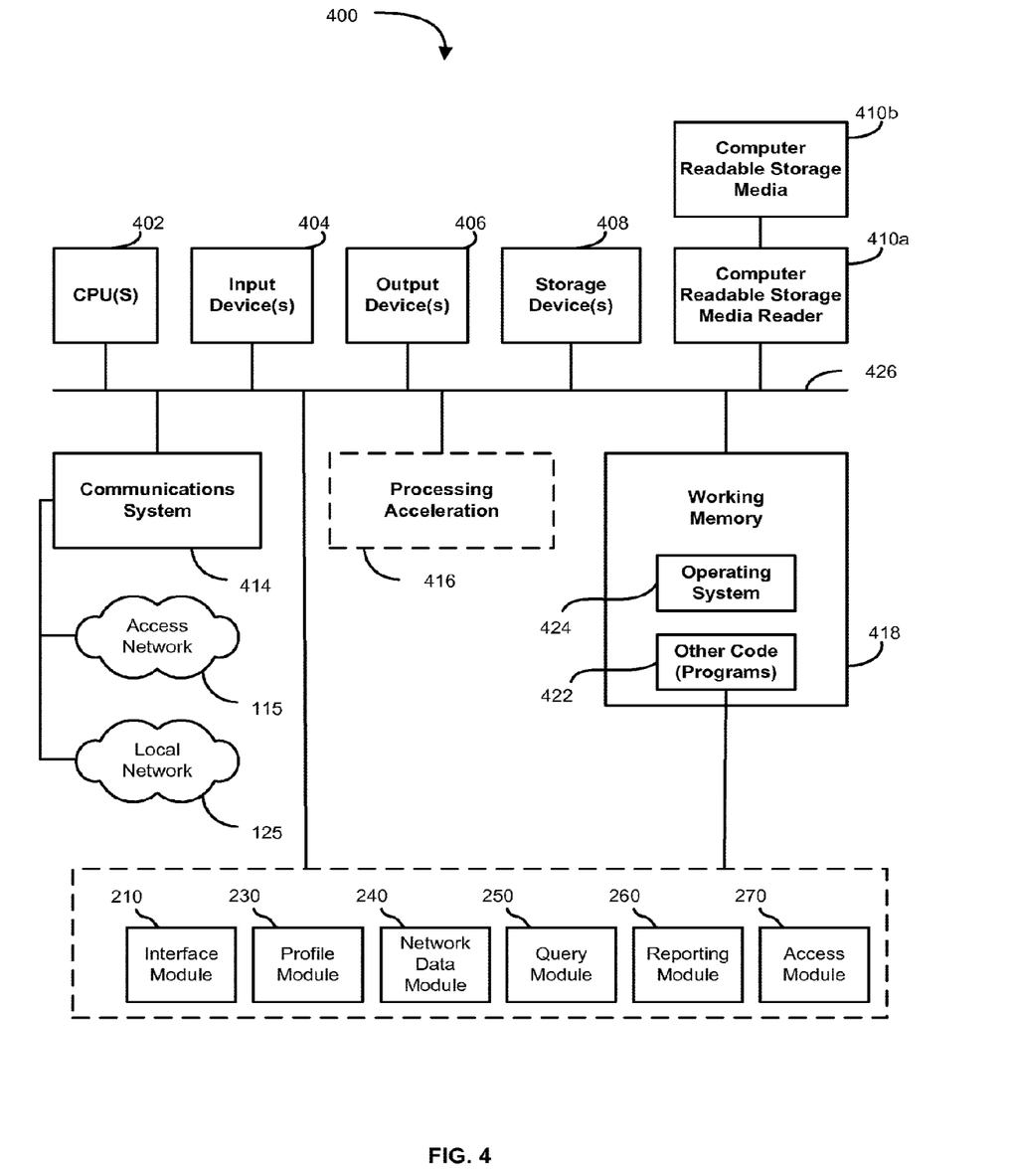
FIG. 4 shows an illustrative computational system for providing some or all of the functionality of a access-controlled subscriber network access point in a network environment, according to various embodiments of the invention.

FIG. 4 shows an illustrative computational system for providing some or all of the functionality of a access-controlled subscriber network access point in a network environment, according to various embodiments of the invention. The computational system 400 is shown having hardware elements that may be electrically coupled via a bus 426 (or may otherwise be in communication, as appropriate). The hardware elements may include one or more processors 402, including without limitation one or more general-purpose processors and/or one or more special-purpose processors (such as digital signal processing chips, graphics acceleration chips, and/or the like); one or more input devices 404, which can include without limitation a mouse, a keyboard, and/or the like; and one or more output devices 406, which can include without limitation a display device, a printer, and/or the like.

The computational system 400 may further include (and/or be in communication with) one or more storage devices 408, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like. Embodiments of the storage devices 408 may include or provide functionality of a data storage module (e.g., the data storage modules 280 of FIGS. 2 and 3).

The computational system 400 might also include a communications subsystem 414, which can include without limitation a modem, a network card (wireless or wired), an infrared communication device, a wireless communication device and/or chipset (such as a Bluetooth device, an 802.11 device, a WiMAX device, cellular communication facilities, etc.), and/or the like. The communications subsystem 414 may permit data to be exchanged with one or more networks, including an access network 115, local network 125, and/or any other networks or devices described herein. In many embodiments, the computational system 400 will further comprise a working memory 418, which can include a RAM or ROM device, as described above.

The computational system 400 also may include software elements, shown as being currently located within the working memory 418, including an operating system 424 and/or other code, such as one or more application programs 422, which may include computer programs of the invention, and/or may be designed to implement methods of the invention and/or configure systems of the invention, as described herein.

Merely by way of example, functionality of one or more systems, components, or procedures described herein might be implemented as code and/or instructions executable by a computer (and/or a processor within a computer). A set of these instructions and/or code might be stored on a computer readable storage medium 410*b*. In some embodiments, the computer readable storage medium 410*b* is the storage device(s) 408 described above. In other embodiments, the computer readable storage medium 410*b* might be incorporated within a computational system, such as the system 400. In still other embodiments, the computer readable storage medium 410*b* might be separate from the computational system (i.e., a removable medium, such as a compact disc, etc.), and/or provided in an installation package, such that the storage medium can be used to configure a general purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.), then takes the form of executable code. In these embodiments, the computer readable storage medium 410b may be read by a computer readable storage media reader 410a.

In one embodiment, the invention employs the computational system to perform functionality of embodiments of the invention. According to a set of embodiments, some or all of the functions are performed by the computational system 400 in response to processor 402 executing one or more sequences of one or more instructions (which might be incorporated into the operating system 424 and/or other code, such as an application program 422) contained in the working memory 418. Such instructions may be read into the working memory 418 from another machine-readable medium, such as one or more of the storage device(s) 408 (or 410). Merely by way of example, execution of the sequences of instructions contained in the working memory 418 might cause the processor(s) 402 to perform one or more procedures of the methods described herein. In this way, the computational system 400 can be "configured to" or "operable to" perform any number of such procedures or methods.

It is worth noting that the terms "machine readable medium" and "computer readable medium," as used herein, refer to any medium that participates in providing data that causes a machine to operate in a specific fashion. In an embodiment implemented using the computational system 400, various machine-readable media might be involved in providing instructions/code to processor(s) 402 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (408 or 410). Volatile media includes, without limitation dynamic memory, such as the working memory 418. Transmission media includes coaxial cables, copper wire, and fiber optics, including the wires that comprise the bus 426, as well as the various components of the communication subsystem 414 (and/or the media by which the communications subsystem 414 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 402 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 400. These signals, which might be in the form of electromagnetic signals, acoustic signals, optical signals, and/or the like, are all examples of carrier waves on which instructions can be encoded, in accordance with various embodiments of the invention.

The communications subsystem 414 (and/or components thereof) generally may receive the signals, and the bus 426 then may carry the signals (and/or the data, instructions, etc. carried by the signals) to the working memory 418, from which the processor(s) 402 may retrieve and execute the instructions. The instructions received by the working memory 418 may optionally be stored on a storage device 408 either before or after execution by the processor(s) 402. Notably, in certain embodiments, the communication subsystem 414, input devices 404, output devices 406, and/or other components of the computational system 400 may be used to communicate with one or more other computational systems 400 for increased or distributed functionality (e.g., in embodiments like the one shown in FIG. 3).

As such, it will be appreciated that all or some of the functions of the access-controlled subscriber network access point may be implemented as software or firmware components, dedicated hardware components, etc. For example, in one embodiment, the working memory 418 includes code 422 for executing the functionality of an interface module 210, a profile module 230, a network data module 240, a query module 250, a reporting module 260, and/or an access module 270. In another embodiment, some or all of the functionality of those components may be implemented in dedicated or multi-purpose components that are in communication with the bus 426.

Figure 5:
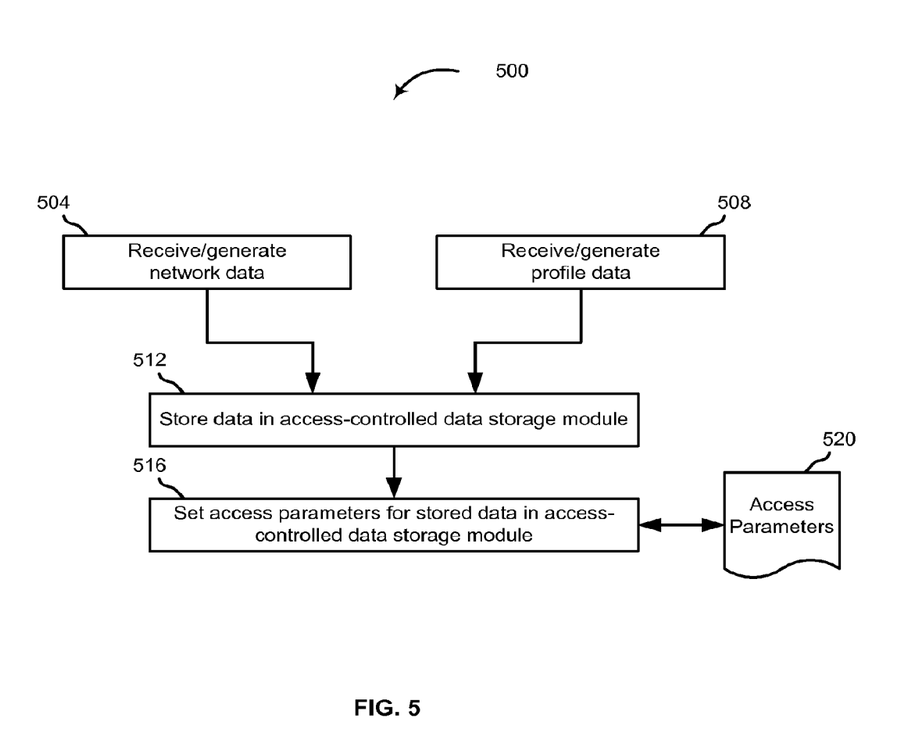
FIG. 5 shows a simplified flow diagram of an illustrative method for generating network characteristic data, according to various embodiments of the invention.

Exemplary functionality of components of the access-controlled subscriber network access point will now be described with reference to the methods of FIGS. 5-8. FIG. 5 shows a simplified flow diagram of an illustrative method for generating network characteristic data, according to various embodiments of the invention. The method 500 begins by receiving and/or generating network data at block 504 and by receiving and/or generating profile data at block 508. The network and/or profile data is then stored at block 512, for example, in a data storage module. As discussed above, the data may be stored in any useful way to allow for controlled access to the data. In block 516, access parameters may be set for controlling access to the data obtained in blocks 504 and/or 508.

Figure 6:
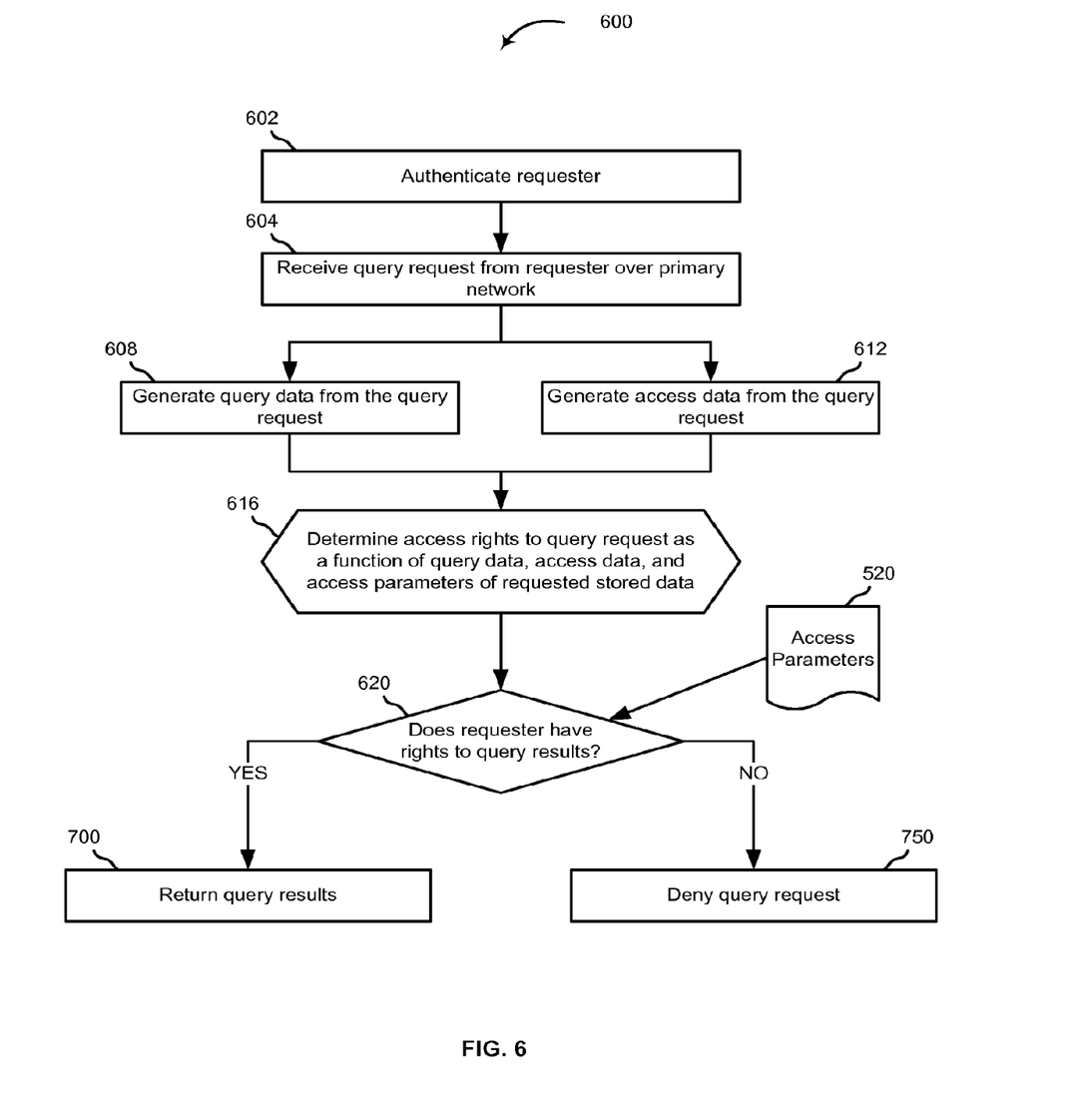
FIG. 6 shows a simplified flow diagram of an illustrative method for providing controlled access to network characteristic data, according to various embodiments of the invention.

Once network characteristic data has been stored in an access-controlled environment, it may be desirable to provide controlled access to the data. FIG. 6 shows a simplified flow diagram of an illustrative method for providing controlled access to network characteristic data, according to various embodiments of the invention. The method 600 begins at block 602 by authenticating a requester. For example, when a content provider requests network characteristic data, the method 600 may begin by receiving authentication information from the content provider.

The authentication information may be received in any useful way. In one embodiment, the content provider is prompted for login information (e.g., a user name and password). In another embodiment, some or all of the authentication information may be detected. For example, the requester may be authenticated based on certain parameters of the request (e.g., data requested, time of day, etc.). In another example, the requester may be authenticated based on information included in packets communicated from the requester. Some embodiments of methods and systems for authenticating content providers based on protocol information and other agreements are described in U.S. application Ser. No. 12/128,841, entitled "APPLICATION LEVELS OF SERVICE OVER A NETWORK"and U.S. application Ser. No. 12/144,727, entitled "BANDWIDTH RESERVATION FOR AUTHENTICATED APPLICATIONS", both of which are hereby incorporated by reference.

The authenticated requester may then request certain network characteristic data, the request being received at block 604. In some embodiments, query data is generated from the request at block 608. For example, the request may be processed into an executable query. In certain embodiments, access data may also be generated from the request data at block 612. For example, a requester may be authorized at block 602 generally to submit queries, but that authorization may not automatically entitle the requester to any and all network characteristic data. Thus, further authorization information may be obtained at block 612.

At block 616, access rights may be determined for the requester as a function of data received in any or all of blocks 602, 604, 608, and 612. For example, some or all of the authentication data, request data, query data, and access data may be used to determine what access rights are associated with the requester and or the specific request. At decision block 620, the access rights determined in block 616 may be used to determine whether the requester has access rights to the requested data. In some embodiments, the decision made in block 620 may also depend on the access parameters 520 generated by the method 500 of FIG. 5. Based on the decision of block 620, query results may either be returned at block 700, or the query may be denied at block 750 (embodiments of which are shown in FIGS. 7A and 7B, respectively).

Figure 7A:
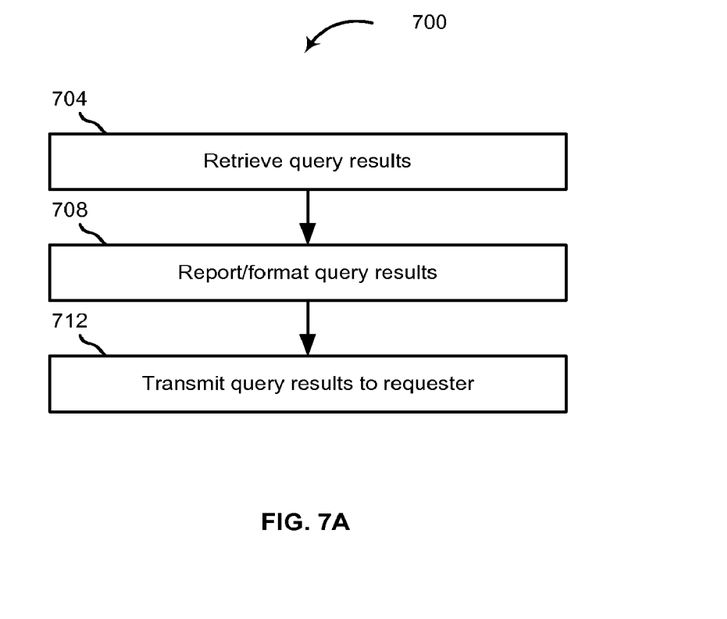
FIG. 7A shows a simplified flow diagram of an illustrative method for returning query results to an authorized requester, according to various embodiments of the invention.

FIG. 7A shows a simplified flow diagram of an illustrative method for returning query results to an authorized requester, according to various embodiments of the invention. The method 700 begins by retrieving query results at block 704. For example, the received request may be processed into an executable query, which may be run against stored network characteristic data, generating query results. The results may then be formatted and/or reported at block 708 for communication back to the requester. The results may then be communicated back to the requester in a useful way in block 712.

Figure 7B:
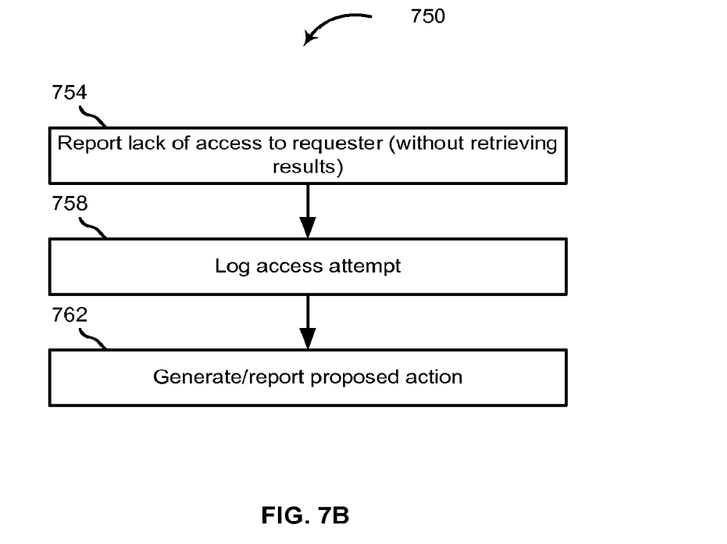
FIG. 7B shows a simplified flow diagram of an illustrative method for denying query results to an unauthorized requester, according to various embodiments of the invention.

FIG. 7B shows a simplified flow diagram of an illustrative method for denying query results to an unauthorized requester, according to various embodiments of the invention. The method 750 begins by reporting a lack of access to the unauthorized requester at block 754. In some embodiments, the denied request may be logged at block 758. In certain embodiments, further information may be reported to the requester and/or other parties, including proposed actions, at block 762. For example, the method may report suggested changes to the query, advertise services based on the denied request, etc.

Figure 8:
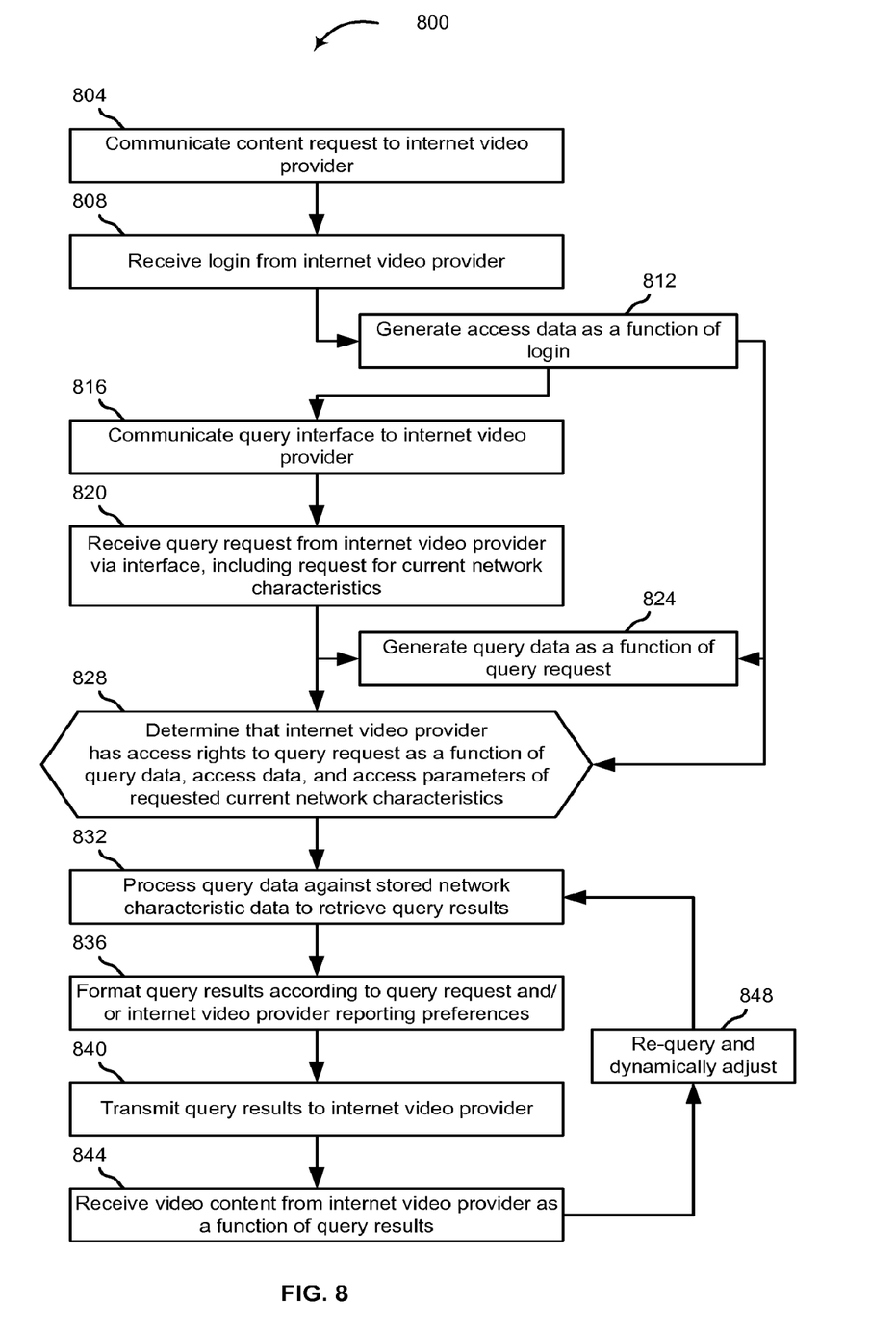
FIG. 8 shows a simplified flow diagram of an illustrative method, in which a subscriber desires video content from an Internet video provider, according to various embodiments of the invention.

A simplified flow diagram of an illustrative method is shown in FIG. 8, in which a subscriber desires video content from an Internet video provider. The method 800 begin at block 804 when the subscriber communicates the request for video content to the Internet video content provider. In the illustrative method, the content provider desires to provide the content optimally as a function of network characteristic information. As such, the content provider has obtained (e.g., purchased) access rights to the desired network characteristic information from the subscriber's network service provider.

At block 808, login information is received from the Internet video provider. Access data is generated as a function of this login data at block 812. For example, the Internet video provider may login using a unique identifier provided by the subscriber's network service provider. After receiving this unique identifier at block 808, access rights associated with the unique identifier may be retrieved and/or generated at block 812 (e.g., from a data storage module in the subscriber's network, from the subscriber's network service provider, etc.).

A query interface may then be communicated at block 816 to the Internet video provider. At block 820, a query request may be received from the Internet video provider via the interface provided in block 816. The query request may include a request for the desired network characteristic data. In some embodiments, the query request received in block 820 may be used to generate query data (e.g., processed into an executable query) at block 824. In certain embodiments, the query is generated partly as a function of the access data generated in block 812. For example, the query request may be interpreted according to access rights of the requester.

A determination may then be made at block 828 that the Internet video provider has access rights to the requested network characteristic data. The determination of block 828 may be made as a function of the authentication data, request data, query data, access data, access parameters, and or any other useful information. After the Internet video provider is determined to have access rights to the data at block 828, the query may be executed against stored network characteristic data.

The results of the query may be retrieved at block 832. The results may then be formatted or otherwise processed at block 836. In some embodiments, the results are formatted according to reporting preferences of the requester (e.g., stored as preferences or submitted with the query request in block 820. The query results may then be communicated to the Internet video provider at block 840.

It will be appreciated that the video content provider may use the returned query data in a number of different ways. In one embodiment, at block 844, the Internet video provider uses the query results to optimize communication of video content to the subscriber. In another embodiment, the video content provider periodically or continuously re-queries the network characteristic data at block 848 and dynamically adjusts content delivery to changes in the data.

In yet another embodiment, the video content provider determines what content to offer based at least partially on the returned query data. For example, a subscriber may access an IPTV program listing (e.g., an electronic program guide, or "EPG"). The IPTV provider may query the subscriber's network characteristic data to determine what types of content the subscriber may reliably receive (e.g., based on the subscriber's throughput, terminal resolution, etc.). The EPG may then only list (or may flag) content that may be reliably received by the subscriber as a function of the received query results.

It will be apparent to those skilled in the art that substantial variations may be made in accordance with specific requirements to all of the systems, methods, software, and other embodiments described above. For example, customized hardware might also be used, and/or particular elements might be implemented in hardware, software (including portable software, such as applets, etc.), or both. Further, connection to other computing devices such as network input/output devices may be employed.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A network access point, located at a premises of a subscriber of network services provided by a network service provider, and in operative communication with a primary network via an access network and a plurality of subscriber devices via a local network, the network access point comprising:
   at least one processor and a set of software modules executable by the processor to perform one or more operations, the set of software modules embodied on one or more non-transitory computer-readable media and comprising:
      a data storage module that stores network characteristic data that comprises characteristics of one or more communication links between the network access point and the primary network, amounts of bandwidth allocated to each of the subscriber devices, capabilities of at least one of the subscriber devices, and device-specific preferences for at least one of the subscriber devices;
      an interface module that receives a request for a requested portion of the network characteristic data over the access network from a requesting party;
      an access module that determines whether the requesting party has access rights to the requested portion of the network characteristic data;
      a query module that executes a query against the network characteristic data when the requesting party has access rights to the requested portion of the network characteristic data, the query being generated as a function of the request and retrieving results data relating to at least some of the requested portion of the network characteristic data; and
      a reporting module that reports the results data for communication over the access network to the requesting party.

2. The network access point of claim 1, wherein:
the interface module receives requester profile data relating to access privileges of the requesting party; and
the access module determines whether the requesting party has access rights to the requested portion of the network characteristic data as a function of the requester profile data.

3. The network access point of claim 1, further comprising:
a profile module, to:
   receive profile information relating to at least one of the subscriber, the access network, the local network, or at least one of the subscriber devices; and
   generate a portion of the network characteristic data as a function of the profile information.

4. The network access point of claim 1, further comprising:
a network data module, to:
   measure network characteristics of at least one of the access network, the local network, or at least one of the subscriber devices; and
   generate a portion of the network characteristic data as a function of the network characteristics.

5. The network access point of claim 4, wherein the network data module generates network statistics as a function of at least one of the measured network characteristics or the network characteristic data.

6. The network access point of claim 1, wherein the requesting party is a party other than the network service provider.

7. The network access point of claim 1, wherein at least a portion of the network characteristic data indicates provisioned network characteristics.

8. The network access point of claim 1, wherein the interface module comprises a web server to communicate a graphical query interface for receiving the request from the requesting party over the access network.

9. The network access point of claim 1, wherein the reporting module formats at least a portion of the results data according to formatting criteria prior to communicating the results data over the access network to the requesting party.

10. The network access point of claim 9, wherein the formatting criteria are received as part of the request.

11. The network access point of claim 9, wherein the formatting criteria relate to at least one of sorting, filtering, or translating.

12. The network access point of claim 1, wherein the network access system comprises a modem having a modem housing, and the data storage module is located at least partially inside the modem housing.

13. A method for providing controlled access to a requesting party requesting network characteristic data associated with a subscriber of network services provided by a network service provider, the method comprising:
   receiving, at a network access point at a subscriber location, a request from the requesting party for a requested portion of the network characteristic data, the network access point being in operative communication with a plurality of subscriber devices at the subscriber location, the network characteristic data being stored in a data storage module located at a subscriber end of an access network over which the subscriber receives the network services, the request being received over the access network, the access network providing communication between the network access point and a primary network, the network characteristic data including characteristics of one or more communication links between the network access point and the primary network, amounts of bandwidth allocated to each of the subscriber devices, capabilities of at least one of the subscriber devices, and device-specific preferences for at least one of the subscriber devices;

determining, at the network access point, whether the requesting party has access rights to the requested portion of the network characteristic data; and only when the requesting party has access rights to the requested portion of the network characteristic data:
executing a query against the network characteristic data as a function of the request;
retrieving results data relating to at least some of the requested portion of the network characteristic data as a function of the executed query; and
reporting the results data from the network access point for communication over the access network to the requesting party.

14. The method of claim 13, further comprising:
authenticating the requesting party prior to receiving the request.

15. The method of claim 14, wherein at least one of determining whether the requesting party has access rights or authenticating the requesting party is performed remote to the subscriber end of the access network.

16. The method of claim 13, further comprising:
obtaining a portion of the network characteristic data;
storing the portion of the network characteristic data in the data storage module; and associating access parameters with the portion of the network characteristic data, the access parameters defining access rights relating to the portion of the network characteristic data.

17. The method of claim 16, wherein obtaining the portion of the network characteristic data comprises measuring network characteristics and generating the portion of the network characteristic data as a function of the measured network characteristics.

18. The method of claim 13, further comprising:
when the requesting party lacks access rights to the requested portion of the network characteristic data, reporting the lack of access to the requested portion of the network characteristic data over the access network to the requesting party.

19. The method of claim 13, further comprising:
when the requesting party lacks access rights to the requested portion of the network characteristic data:
generating a proposed action as a function of the lack of access to the requested portion of the network characteristic data; and
reporting the proposed action over the access network to the requesting party.

20. The method of claim 13, further comprising:
receiving content from the requesting party partially as a function of the results data.

21. The method of claim 20, further comprising:
buffering at least a portion the received content partially as a function of the results data.

22. The method of claim 13, further comprising:
logging information relating to the request.

23. The method of claim 13, further comprising:
executing an administrative task at least partially as a function of the results data, the administrative task relating to at least one of tracking, billing, network load balancing, or security.

24. The method of claim 13, wherein the requesting party is the service provider.

25. A non-transitory computer-readable storage medium having a computer-readable program embodied therein for providing controlled access to a requesting party requesting network characteristic data associated with a subscriber of network services provided by a network service provider, the computer- readable program including instructions for providing the controlled access to the network characteristic data in accordance with the following:

receiving, at a network access point at a subscriber location, a request from the requesting party for a requested portion of the network characteristic data, the network access point being in operative communication with a plurality of subscriber devices at the subscriber location, the network characteristic data being stored in a data storage module located at a subscriber end of an access network over which the subscriber receives the network services, the request being received over the access network, the access network providing communication between the network access point and a primary network, the network characteristic data including characteristics of one or more communication links between the network access point and the primary network, amounts of bandwidth allocated to each of the subscriber devices, capabilities of at least one of the subscriber devices, and device-specific preferences for at least one of the subscriber devices;

determining, at the network access point, whether the requesting party has access rights to the requested portion of the network characteristic data; and only when the requesting party has access rights to the requested portion of the network characteristic data:
executing a query against the network characteristic data as a function of the request;
retrieving results data relating to at least some of the requested portion of the network characteristic data as a function of the executed query; and
reporting the results data for communication over the access network to the requesting party.

26. The storage medium of claim 25, further comprising the data storage module.

27. The storage medium of claim 25, wherein the computer-readable program includes instructions further in accordance with:
obtaining a portion of the network characteristic data;
storing the portion of the network characteristic data in the data storage module; and
associating access parameters with the portion of the network characteristic data, the access parameters defining access rights relating to the portion of the network characteristic data.

* * * * *